Aug. 12, 1930.    G. E. ELIA    1,772,888
NET FOR THE CAPTURE OF UNDERSEA BOATS AND OVERSEA SHIPS
Filed June 8, 1928    3 Sheets-Sheet 1

INVENTOR
GIOVANNI EMANUELE ELIA
by
Attorney.

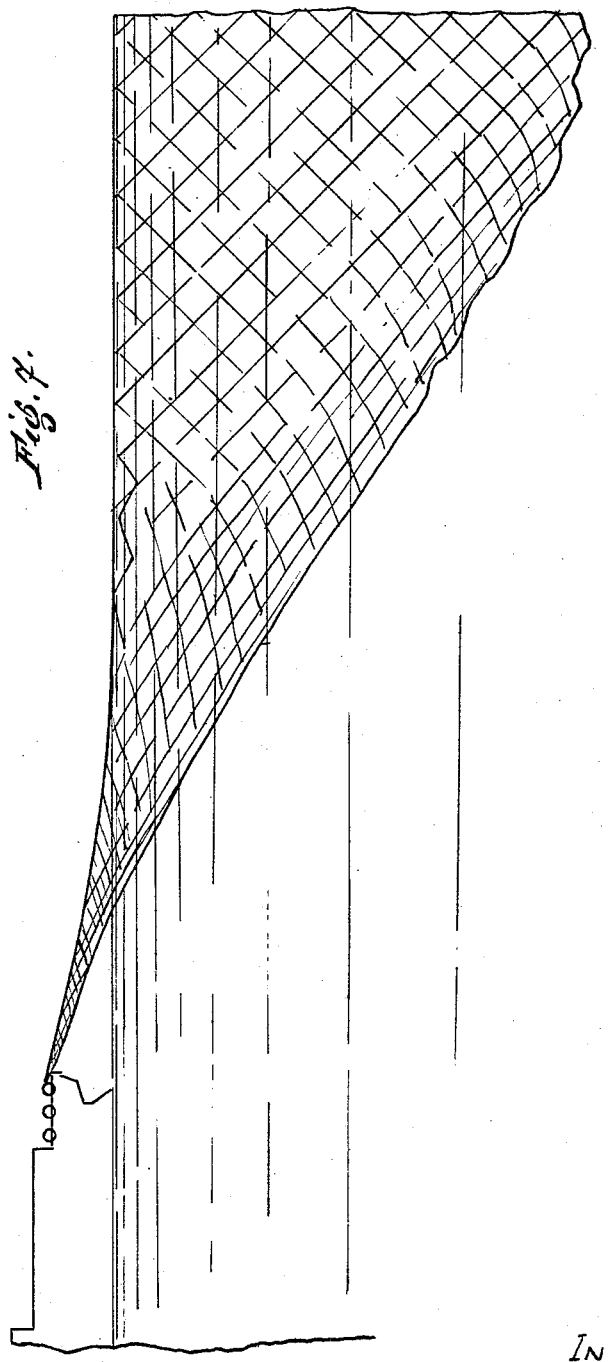

Patented Aug. 12, 1930

1,772,888

UNITED STATES PATENT OFFICE

GIOVANNI EMANUELE ELIA, OF ROME, ITALY

NET FOR THE CAPTURE OF UNDERSEA BOATS AND OVERSEA SHIPS

Application filed June 8, 1928, Serial No. 283,801, and in Italy June 21, 1927.

The subject matter of the present invention essentially consists in a net having great length and depth dimensions and possessed of characteristics that make it suitable for use for war purposes, such as for instance to entangle and fish up underseaboats and to entangle and rupture the propellers of oversea ships and submarines.

The net is manufactured in the desired dimensions by conveniently connecting metal wires, round rods and wire ropes together either alone or promiscuously, so that the section of the net meshes does not exceed a predetermined value.

The metallic materials employed for the manufacture of the net may be plain or zinc-plated or lead-plated or otherwise protected.

The said materials may also be employed in conjunction with other materials lighter than water, so as to build a net the specific weight of which is about the unit.

When no arrangements of the last named kind are resorted to, the top edge of the net is carried by convenient supports, buoys, drifters or other kinds of floating devices which may be secured to the net either after or on laying down the net, or may be previously secured to the net and wound along with it on the bobbins or drums that serve first to store and then to pay out the net. The height of the net meshes, and consequently of the net itself, can be varied. It can be made to assume a minimum value in order to wind the net on the bobbin, and can then be caused to increase up to tens and even hundreds of meters when the net is laid out to sea.

The accompanying drawings illustrate several modified forms of the improved net.

Figure 1:
Figure 2:
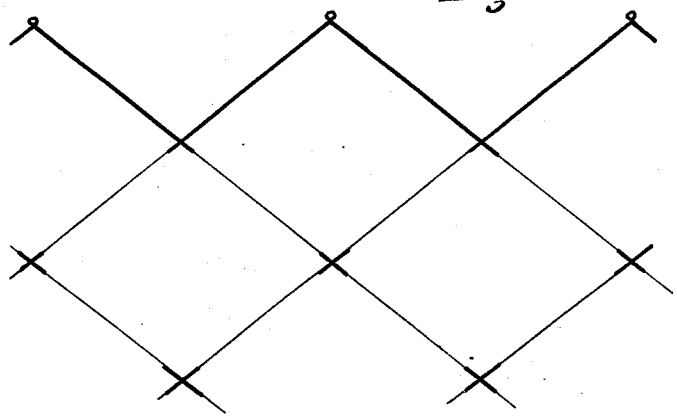
Figure 3:
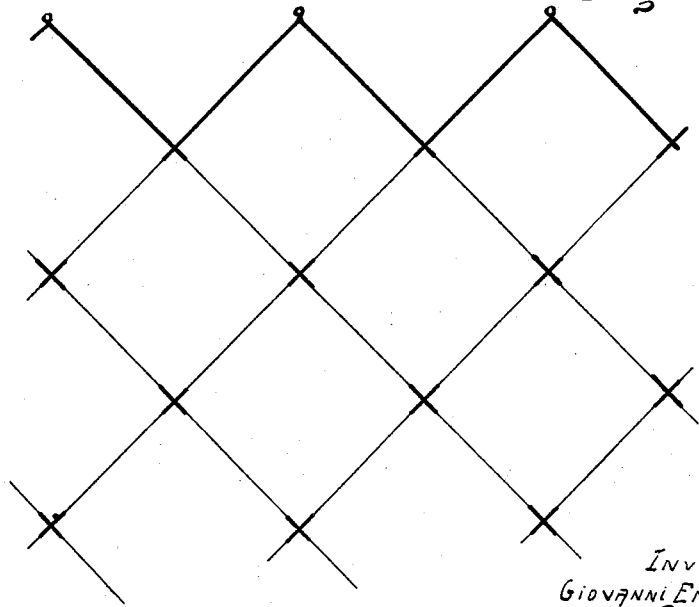
Figure 4:
Figure 5:
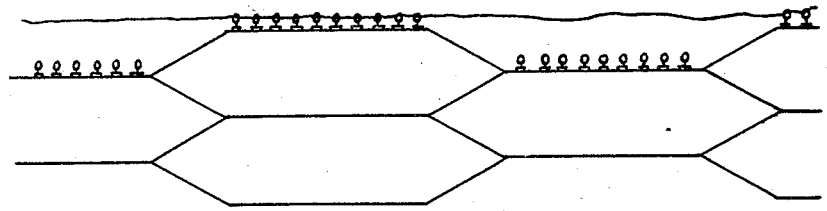
Figure 6:
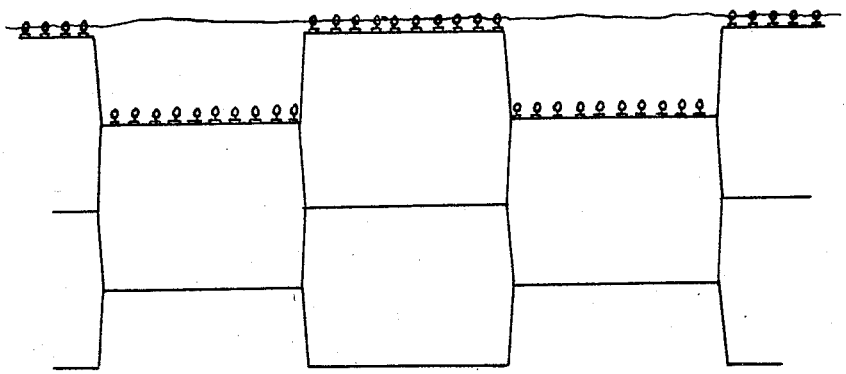

According to Figs. 1, 2, 3 the net meshes and the net spread out in breadth as an abnormously large pantograph might do; according to Figs. 4, 5, 6 the net is built up of elements that arrange themselves horizontally without deformation and of other elements that take up positions varying from the vertical position with fully spread out net to the horizontal position with net contracted for being wound on the bobbins.

Fig. 7 shows the net spread out and sunk in water.

Also other types of net may be manufactured, all exhibiting the characteristic feature that the height of the meshes and therewith of the net can be reduced to a minimum value, so that in these conditions the net shows like a band or bundle of limited section built up of wire-like elements connected among themselves at regular intervals and arranged parallel to one another.

Under these conditions, great net lengths with no floats can be wound on bobbins of very limited width, so as to be quite compact and to fully utilize the space available on the bobbin.

On bobbins of greater width can be wound side by side several lengths of net and these lengths may form or be connected to form a single net by securing the rear end of one length to the forward end of the following length.

This connection is carried out in such a manner that the paying out of the whole net wound on the bobbin can be effected in a regular manner without stops and without tearings, even at considerable velocities.

In a similar manner the net can be wound up and then be unwound from the bobbin along with its floats when it must be sunk.

The floats are secured to the net in such a manner as to permit of winding the greatest possible length of net on the bobbin and to guarantee a safe unwinding therefrom even at a great velocity.

For instance, the floats may be connected with one another so as to form a continuous hinged chain invariably connected to the first wire of the net.

The floats may also be connected to the net, preferably to the top wire of the net, independently from each other.

In the latter case the floats can be cylindrical in section, with a convenient diameter, and, on being wound on the bobbin, they can arrange themselves in the direction of the bobbin generating line, parallel to the axis of the bobbin.

When wound in this manner, the floats will come to lie all on the side of the net.

However, the floats can also be turned through 180° about their connection to the net, so that they can be wound on the bobbin along with the net.

This turning can be so effected that the floats on the bobbin are either covered by the length of net to which they are secured, that is to say they come to lie inside of the net length to which they are secured, or better the turning can be so effected that the floats come to lie to the outside of the said length of net.

With the latter method it is ensured that, on being unwound from the bobbin, the net will drag the floats along with it without any tearing being caused, even when the floats show a tendency to get jammed between the side edges of the net.

The float form and arrangement will be so designed as to secure the best possible utilization of the available bobbin space, bearing in mind that the bobbin is cylindrical.

To this object several floats can also be arranged side by side and so orientated and shaped that they match the shape of the adjacent floats.

For instance, on a length of the bobbin periphery floats of equilateral triangle section can be arranged side by side, with the base of the triangle resting on the bobbin.

The spaces left free between the said floats can then be occupied by other floats, likewise triangular in section, with their vertex pointing downwardly so as to fill all the interval remaining between two adjacent floats.

Once the net has been put out to sea, all the meshes naturally increase in height and the net too increases in height in proportion.

The increase in height at the cost of the net length takes place (eventually with the assistance of auxiliary weights) through the own weight of the wires making up the net, in contrast with the action exerted by the buoys, supports etc. according to the method adopted for holding the net suspended in the water.

For manufacturing the net, the use—even promiscuous—of wires, rods or ropes is provided, all of them being of suitable stiffness, dependently on their size and on the strength of their material, so as to obtain nets susceptible of extending till the desired height or depth is reached.

When the desired depth has been reached, the net can be anchored by its ends or secured to buoys; the net length being thus maintained constant, also its depth is maintained constant.

In order to lessen the visibility of the net, the buoys employed can be so constructed that a portion of the buoy can fill itself with water.

Or watertight and completely floadable buoys may be used simultaneously in convenient proportions. Either in this manner or with partly floodable buoys, the total floating force thus imparted to the net can be reduced to a minimum and even be made of negative sign, the buoys being thus caused to disappear.

The wires, rods or ropes forming the net can be connected together at the vertex of each mesh by means of pivotal pins or by means of elements hinged like of a chain, or they may be simply soldered or tied or otherwise coupled together.

The paying out of the net at sea can be carried out at a speed in excess of the speed of the net-laying ship, so that the net length paid out in excess of the distance travelled by the ship during the same period makes up in full or in part for the shortening which the net must undergo in order to allow the meshes to conveniently extend in width.

In order to facilitate the unwinding from the bobbin, a cable of convenient length will be wound on the bobbin, one cable end being attached to the rear end of the net and the free cable end being attached to a weight or to a floating anchor.

The paying out of this cable will enable the bobbin to start revolving with a velocity which is suitable for paying out the net.

In order to pay out the net, the bobbin can be driven by a motor through the intermediary of a reducing gearing, eventually of the worm and helical wheel type.

The bobbin or the drive therefor can be fitted with a brake for adjusting the unwinding velocity.

The bobbins can be fitted with a device of any of the usual types (guide, roller or other type) for straightening the net on its leaving the bobbin.

The net-laying ship, in case the position in which the bobbins are erected should require it, can be provided with guiding devices serving to prevent the net from being caught in the ship propellers. The bobbins carrying the net may be erected on the ship's stern, or they can even be erected overhanging along side the ship.

The net can be made heavier than the upward or floating thrust of the submarines, so that when the submarine strikes against the net, the net is detached from the buoys and falls upon the submarine; if the net is heavier than the floating thrust of the submarine, the latter will be sunk.

Having now particularly described and ascertained the nature of my said invention and in what manner the same is to be performed, I declare that what I claim is:—

1. A net for trapping or entangling the ships or submarines comprising a plurality of rigid links or elements connected in meshes with means for limiting the expansion or opening of the meshes transversely of the net, said net being free to collapse in width and extend in length.

2. A deformable trap net having the character defined in claim 1 in which the horizontally presented links or elements are rigid and the vertical links or elements are flexible when the net is spread out.

3. A trap net of the character defined in claim 1 fitted with a continuous chain of flexibly connected supporting floats attached to said net.

4. A trap net of the character defined in claim 1 having a combination of supporting buoys, some of which are capable of being flooded whereby the buoyancy of the buoyed net may be regulated.

Signed at Rome, (Italy), this 23rd day of May, 1928.

GIOVANNI EMANUELE ELIA.